United States Patent [19]

Nagase et al.

[11] Patent Number: 4,867,660
[45] Date of Patent: Sep. 19, 1989

[54] FOAM SLUSH MOLDING APPARATUS

[75] Inventors: Takashi Nagase, Aichi; Yoshio Taguchi, Nagoya, both of Japan

[73] Assignee: Toyota Jidosha Kabushiki Kaisha, Aichi, Japan

[21] Appl. No.: 923,641

[22] Filed: Oct. 27, 1986

[30] Foreign Application Priority Data

Apr. 11, 1986 [JP] Japan .................................. 61-54594

[51] Int. Cl.⁴ ...................... B29C 33/04; B29C 33/30; B29C 39/38; B29C 41/46
[52] U.S. Cl. .................................... 425/4 R; 425/435; 425/817 R
[58] Field of Search ................. 249/79, 137; 425/435, 425/4 R, 817 R, 428, 430, 434; 264/DIG. 60

[56] References Cited

U.S. PATENT DOCUMENTS

| | | | |
|---|---|---|---|
| 2,829,117 | 4/1958 | Lindeman | 264/51 |
| 2,958,905 | 11/1960 | Newberg et al. | 264/51 |
| 3,095,260 | 6/1963 | Ferriot | 264/DIG. 60 |
| 3,278,658 | 10/1966 | Immel | 425/817 R |
| 3,316,339 | 4/1967 | Breneman | 264/310 |
| 3,574,245 | 4/1971 | Dohm | 425/435 |
| 3,584,105 | 6/1971 | Pekor | 425/435 |
| 3,594,461 | 7/1971 | Jacob | 264/51 |
| 3,598,769 | 8/1971 | Hanton | 264/51 |
| 3,709,651 | 1/1973 | Lahouse | 264/51 |
| 3,832,429 | 8/1974 | Charpentier | 264/51 |
| 3,941,528 | 3/1976 | Cotterell | 425/817 R |
| 4,053,126 | 10/1977 | Duret et al. | 264/310 |
| 4,192,638 | 3/1980 | Lezier et al. | 264/51 |
| 4,331,626 | 5/1982 | Colby | 264/DIG. 60 |
| 4,431,397 | 2/1984 | Fried et al. | 249/137 |
| 4,548,779 | 10/1985 | Steinberg et al. | 264/255 |
| 4,621,995 | 11/1986 | Wersosky | 425/435 |
| 4,689,004 | 8/1987 | Kunkel | 264/51 |

FOREIGN PATENT DOCUMENTS

| | | | |
|---|---|---|---|
| 2117559 | 4/1972 | Fed. Rep. of Germany | 425/435 |
| 58-132507 | 8/1983 | Japan . | |
| 60-101014 | 6/1985 | Japan . | |
| 60-139410 | 7/1985 | Japan . | |
| 6607494 | 2/1967 | Netherlands | 425/425 |

OTHER PUBLICATIONS

Kobayashi et al., Power Molding Technology, Sumitomo Chemical Industries Co., Ltd., 1985.

*Primary Examiner*—Willard Hoag
*Attorney, Agent, or Firm*—Finnegan, Henderson, Farabow, Garrett & Dunner

[57] ABSTRACT

The foam slush molding apparatus of this invention comprises a mold and a hot air jacket, and an optional heat retaining hood. The hot air jacket and the optional heat retaining hood are provided along and a certain distance apart from the molding surface on which a resin is heated and fused. The molding surface and the jacket form a first hot air chamber for heating, and the jacket and the optional heat retaining hood form an optional second hot air chamber for heat retention. The apparatus permits uniform heating and foaming at an efficient molding cycle.

9 Claims, 4 Drawing Sheets

FOAM SLUSH MOLDING APPARATUS

BACKGROUND OF THE INVENTION

1. Field of the Invention:

The present invention relates to a foam slush molding apparatus which performs molding and foaming simultaneously.

2. Description of the Prior Art:

Slush molding involves the basic steps of filling a preheated mold with a plastisol, which is highly viscous liquid composed of fine particles of plastics and plasticizer, causing the plastisol to stick to the inside of the mold, inverting the mold to pour out the excess plastisol, exposing the mold to heat for gelation of the sol sticking to the inside of the mold, and cooling the mold. This type of molding is conventionally called sol slush molding.

There is another type of slush molding, which is called powder slush molding. This molding process employs powdered resin.

The "foam slush molding" of the present invention can employ a sol or powdered resin containing a blowing agent and performs gelation and foaming simultaneously. This molding processes may be used for making automotive instrument panels which have a thin skin of, for example, plasticized polyvinyl chloride (PVC).

The heating and foaming of a resin containing a blowing agent are usually accomplished by the use of hot air or infrared radiation. For example, foamed PVC sheet is produced by passing an unrolled stock sheet continuously through a hot-air oven at about 200° C. This foaming method is adequate for sheet-like objects which are uniformly heated. However, it is inadequate for objects of complex shape which are not uniformly heated. In the latter case, excessive foaming takes place on those parts sufficiently exposed to heat (such as periphery 1 and vertical surface 2 shown in FIG. 11) and insufficient foaming takes place on other parts which are not sufficiently exposed to heat. As a result, the foamed skin is unsatisfactory. The disadvantage of heating by infrared radiation is that undercuts and other parts are not exposed to radiation.

The present invention was completed in view of the above-mentioned circumstances. Accordingly, it is an object of the present invention to provide a molding apparatus capable of uniformly foaming the plastic or resin constituting a skin of complex shape.

Additional objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

SUMMARY OF THE INVENTION

To achieve the objects and in accordance with the purpose of the invention as embodied and broadly described herein, the foam slush molding apparatus of this invention comprises a mold and a hot air jacket provided along and a certain or predetermined distance apart from the molding surface on which the resin is heated and fused. The mold and jacket form a first hot air chamber that supplies heat for foaming. The first hot air chamber is provided with a hot air inlet and a hot air outlet.

The molding apparatus is constructed such that hot air is forced into the first hot air chamber through the hot air inlet to heat the resin powder in contact with the molding surface, and it is discharged through the hot air outlet. Molding with this apparatus is carried out as follows. The mold is preheated, the preheated mold is filled with plastisol, and the excess plastisol is removed, for example, dumped out. The hot air jacket (made of an insulating material) is positioned with the mold, for example, placed on the mold, and hot air is forced into the first hot air chamber so that gelation and foaming take place uniformly all over the molding surface. Therefore, the molding apparatus of this invention permits uniform foaming no matter how complex the shape of the molded item might be. In addition, it permits one to easily control the expansion ratio, (i.e., the ratio of foaming material thickness before and after foaming).

The molding apparatus of the present invention obviates the conventional heating oven, and it produces pronounced energy savings because it requires only a minimum amount of hot air for heating.

If the gap between the slush mold and the hot air jacket is less than about 5 mm, the hot air does not pass freely because of high resistance. This induces local suppression of foaming.

For the effective heating of resin with the apparatus of this invention, the hot air jacket can be provided with a heat insulating or heating means. An example of the heat insulating means is a metal hood to cover the hot air jacket, and an example of the heating means is a heater built into the hot air jacket. Where a metal hood is used for heat insulation, it is necessary to provide a motor and support to open and close the hood and a space to permit movement of the hood.

Where a built-in heater is used, the hot air is not used to keep the hot air jacket heated after the heating cycle. In other words, in the cycle for the gelation of the resin, hot air is supplied to the first hot air chamber, and in the following cycle with no heating, the hot air jacket cools. However, it is desirable to keep the hot air jacket hot after the heating cycle to repeat the molding and foaming efficiently in a short cycle. This is accomplished only by the built-in heater.

The above-mentioned shortcoming is eliminated by the slush molding apparatus of the present invention constructed as follows. The hot air jacket is provided along and a certain distance apart from the molding surface so that the first hot air chamber (for heating and foaming) is formed between the mold and the jacket. The heat insulating hood is provided outside the hot air jacket so that a second hot air chamber (for heat retention) is formed between them. The first hot air chamber is connected to a first duct for providing hot air for heating purposes through the hot air inlet. The second hot air chamber is connected to a second duct for providing hot air for heat retention. When the resin is to be heated, hot air is introduced into the first hot air chamber through the first duct. In the non-heating cycle, hot air for heat retention is introduced into the second hot air chamber through the second duct.

The apparatus of this invention has the heat insulating hood outside the hot air jacket, so that hot air is introduced into the second chamber formed between them in the cycle when the resin in not heated. Therefore, the hot air jacekt does not cool but remains hot even after the molding and foaming of the resin. This contributes to the shortening of the molding and foaming cycles.

In addition, the hot air jacket is kept hot by the hot air. Thus, it is unnecessary to add an apparatus for heat retention and hence to provide the space for it.

The accompanying drawing which are incorporated in and constitute a part of this specification, illustrate embodiments of the invention and, together with the description, serve to explain the principles of the invention.

DESCRIPTION OF THE PREFERRED EMBODIMENTS

Reference will now be made in detail to preferred embodiments of the invention, examples of which are illustrated in the accompanying drawings.

EXAMPLE 1

Figure 1:
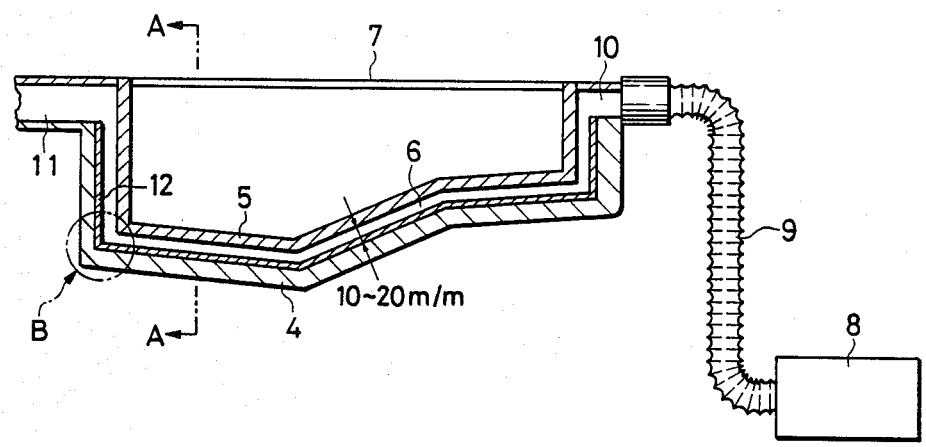
FIG. 1 is a sectional view of one embodiment of the present invention, as described in Example 1.

FIG. 1 shows a sectional view of one embodiment of the apparatus of the present invention. It shows a mold 4 for slush molding, a removable hot air jacket 5 made of an insulating material, and a gap 6 formed between the mold 4 and the hot air jacket 5. The gap is, for example, 15 mm, and uniform throughout.

Figure 2:
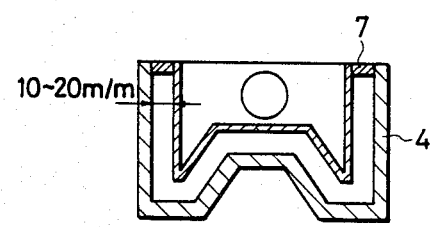
FIG. 2 is a sectional view taken along the line II—II in FIG. 1.

FIG. 2 shows a sectional view taken along the line II—II in FIG. 1. The external edge 7 of the hot air jacket 5 functions as the lid of the gap 6 that keeps the hot air in the jacket.

A hot air generator 8 is also shown in FIG. 1. Hot air is introduced into the gap 6 through the hose 9 and the hot air inlet 10. The hot air flows through the gap 6 at a uniform flow rate and exits at the hot air outlet 11.

Figure 3:
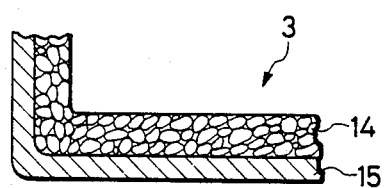
FIG. 3 is an enlarged sectional view of the part indicated by B in FIG. 1.
Figure 4:
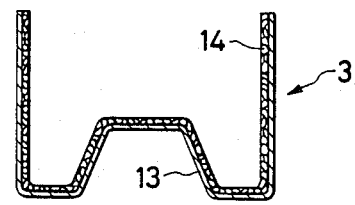
FIG. 4 is a sectional view of a foamed skin obtained by foam slush molding using the apparatus of the present invention as described in Example 1.

The operation of the apparatus includes the following steps. At first, the skin 12 composed of a solid PVC layer (for example, 0.3 to 0.5 mm thick) and an expandable PVC layer (for example, 0.5 to 0.8 mm thick) containing a blowing agent is formed by ordinary slush molding. After the recovery of excess plastisol or powder, the hot air jacket 5 is positioned and hot air is introduced into the gap 6 so that heat is applied to the expandable PVC layer of the skin. As a result of heating, a uniformly foamed skin 3 having the foam layer, for example, 2.5 to 3.0 mm thick is obtained, as shown in FIG. 3 which is an enlarged sectional view of the part indicated by B in FIG. 1. The solid PVC layer 13 and the expanded layer 14 are shown in FIGS. 3 and 4.

EXAMPLE 2

Figure 5:
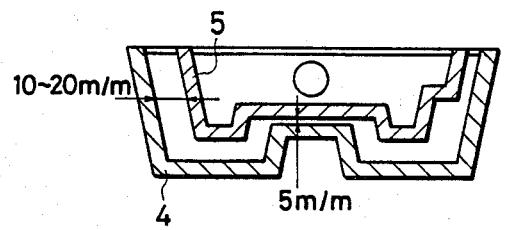
FIG. 5 is a sectional view of another embodiment of the apparatus of the present invention as described in Example 2.
Figure 6:
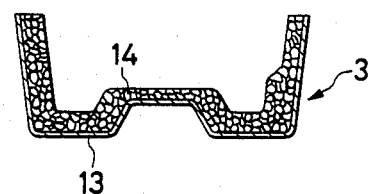
FIG. 6 is a sectional view of the foamed skin obtained by foam slush molding using the apparatus of the present invention as described in Example 2.

In cases where the molded item has some parts which do not need complete expansion, the gap 6 for hot air may be partly narrowed, for example, to less than 5 mm, as shown in FIG. 5. The reduction of hot air by the narrowed part suppresses the foaming, as shown in FIG. 6. If the hot air jacket 5 is properly designed so that the gap gradually varies, it is possible to produce a foamed product with a soft texture.

EXAMPLE 3

If hot air is introduced into the gap 6 when the hot air jacket 5 is at normal temperature, the heat of the hot air is absorbed by the jacket 5. This may be prevented by positioning the jacket 5 and passing hot air through the gap prior to the slush molding. Another way to perform efficient heating is to keep the jacket hot at all times by means of a heater built into the jacket.

EXAMPLE 4

Figure 7:
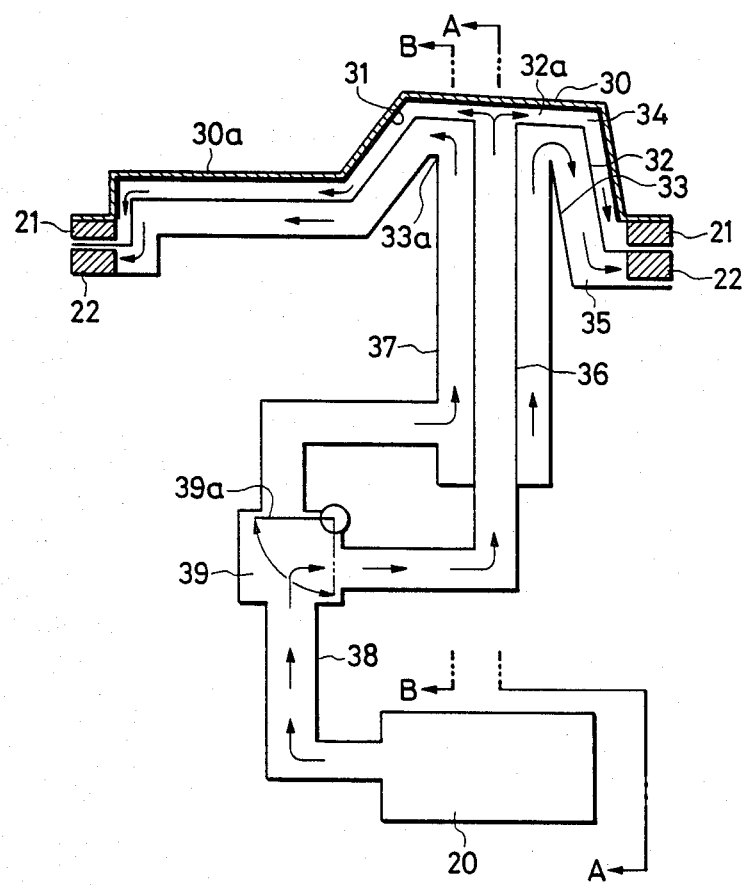
FIG. 7 is a schematic drawing of still another embodiment of the apparatus of the present invention as described in Example 4.

The apparatus of this example is shown in FIG. 7. The skin 31 of the resin to be heated is formed on the molding surface 30a of the mold 30. The skin is composed of a solid PVC layer (for example, 0.3 to 0.5 mm thick) formed by conventional slush molding and an expandable PVC layer (for example, 0.5 to 0.8 mm thick) containing a blowing agent.

The hot air jacket 32 is provided along and a certain distance (for example, 5 to 20 mm) apart from the molding surface 30a of the mold 30. The heat retaining hood 33 is provided along and a certain distance (for example, 10 to 50 mm) apart from the hot air jacket 32. Thus, a first hot air chamber 34 (for heating) is formed between the molding surface 30a of the mold 30 and the hot air jacket 32, and a second hot air chamber 35 (for heat retention) is formed between the hot air jacket 32 and the heat retaining hood 33.

The hot air jacket 32 is provided with an inlet 32a for hot air used for heating, and the heat retaining hood 33 is provided with an inlet 33a for hot air used for heat retention. Hot air introduced through the inlet 32a for heating purposes impinges upon the molding surface 30a of the mold 30 opposite to the inlet 32a. The hot air impinging upon the molding surface 30a should have a uniform pressure. For this reason, that part (including the vicinity thereof) of the mold 30 which is adjacent, e.g., opposite to the inlet 32a for the hot air for heating purposes is recessed in the flow direction of the hot air.

The inlet 32a for the hot air for heating purposes is connected to a first duct 36 for said hot air for heating purposes, and the inlet 33a for the hot air for heat retention is connected to a second duct 37 for said heat retaining hot air. The two ducts 36 and 37 are combined into a main duct 38. At the point where the two ducts 36 and 37 are combined or at the point where the main duct 38 is branched into the two ducts, there is provided a diverter valve 39. Thus, the hot air supplied through the main duct 38 is directed to either the duct 36 or the duct 37, depending on the position of the valve disk 39a of the diverter valve 39. The forward end of the duct 36 is coaxially inserted into the forward end of the duct 37, so that they form a double duct. The reference numeral 20 indicates the hot air generator connected to the main duct 38.

Figure 8:
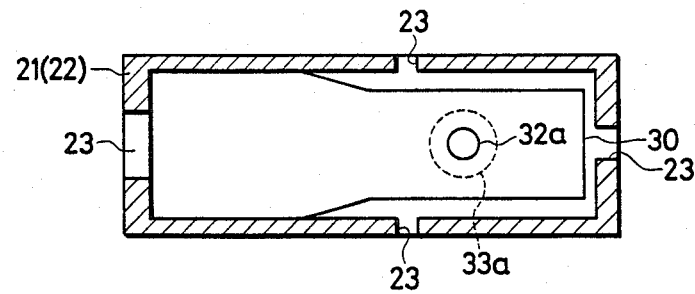
FIG. 8 is a schematic plan view of the apparatus shown in FIG. 7.

As shown in FIGS. 7 and 8, a sealing material 21 is interposed between the periphery of the mold 30 and the periphery of the hot air jacket 32, and a sealing material 22 is interposed between the periphery of the hot air jacket 32 and the periphery of the heat retaining hood 33. These sealing materials improve the air tightness of the first hot air chamber 34 (for heating) and the second hot air chamber 35 (for heat retention). The sealing materials 21 and 22 are partially cut to form the outlets 23 for hot air. The number and position of the outlets 23 are properly determined to control the flow direction of hot air in the hot air chambers 34 and 35.

Figure 9:
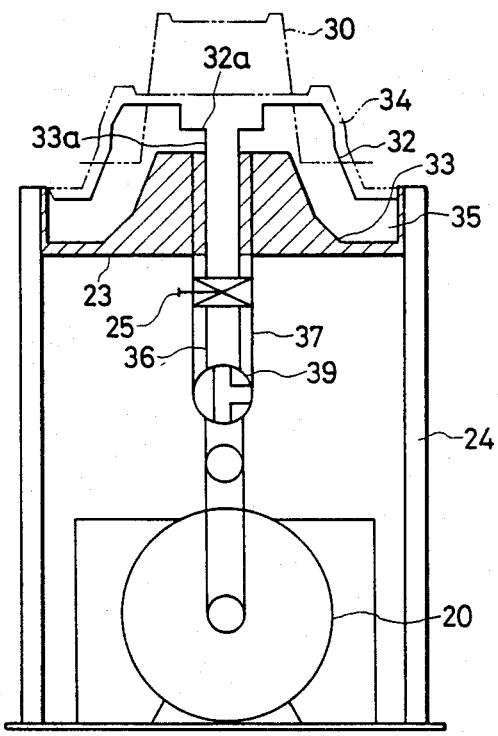
FIG. 9 is a sectional view taken along the line A—A in FIG. 7.
Figure 10:
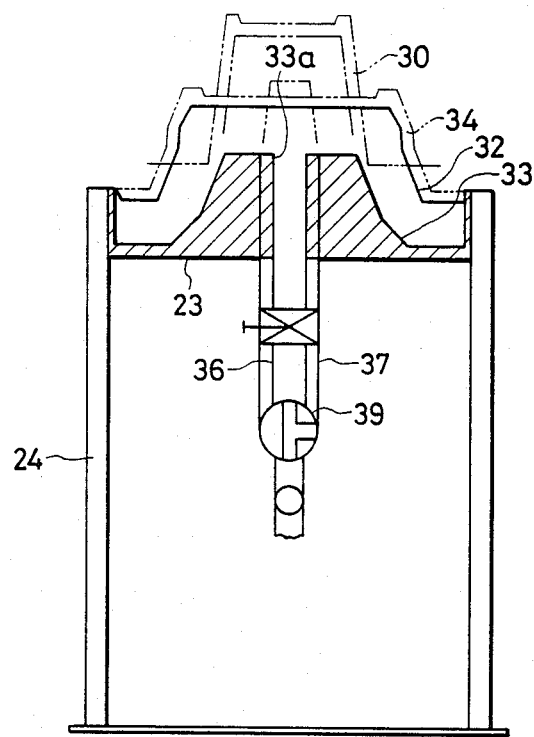
FIG. 10 is a sectional view taken along the line B—B in FIG. 7.
Figure 11:
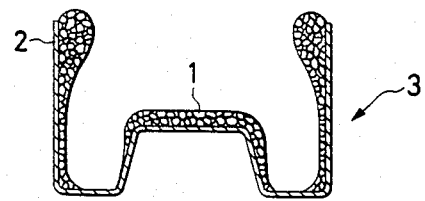
FIG. 11 is a sectional view of the foamed skin obtained by a conventional foam slush molding apparatus.

FIGS. 9 and 10 show the detailed structures of the hot air chamber 36 for heating and the hot air chamber 37 for heat retention. In this example, the deiverter valve 39 is a three-way valve which diverts the flow of hot air to either the duct 36 or the duct 37. FIGS. 9 and 10 show an insulating material 24 provided outside the heat retaining hood 33, a support 25 to support the mold 30, hot air jacket 32 and heat retaining hood 33, and valve 26 to control the flow rate of hot air.

The apparatus described in Example 4 operates in the following manner. At first, the mold 30 is filled with plastisol or resin powder so that a fused resin layer is formed on the molding surface 30a. Excess plastisol or resin powder is then recovered. The hot air jacket 32 and the heat retaining hood 33 are positioned with the mold. The valve disk 39a of the diverter valve 39 shown in FIG. 7 is switched to the position shown so that the main duct 38 communicates with the hot air duct 36. Hot air is supplied to the first hot air chamber 34, whereby the resin 31 is heated. After the heating is completed, the valve disk 39a of the diverter valve 39 is switched to the position indicated by the dotted line, so that the main duct 38 communicates with the duct 37. Hot air is supplied to the second hot air chamber 35 so that the hot air jacket 33 is heated from outside and kept hot. The hot air introduced into the first hot air chamber 34 for heating or the second hot air chamber 35 for heat retention is discharged from the outlet 23.

It will be apparent to those skilled in the art that various modifications and variations can be made in the foam slush molding apparatus of the present invention without departing from the scope or spirit of the invention. Thus, it is intended that the present invention cover the modifications and variations of this invention provided they come within the scope of the appended claims and their equivalents.

What is claimed is:

1. A foam slush molding apparatus comprising:
   a mold including a molding surface on which a resin is heated and fused;
   a hot air jacket provided along and a predetermined distance apart from said molding surface to allow the free passage of hot air therethrough, said molding surface and said jacket forming a first hot air chamber therebetween, wherein in said first hot air chamber said resin is heated for foaming;
   a heat retaining hood provided outside said hot air jacket, said hot air jacket and said heat retaining hood forming a second hot air chamber for heat retention;
   a first hot air duct connected to said first hot air chamber through an opening in said hot air jacket;
   a second hot air duct connected to said second hot air chamber; and
   switching means to divert hot air alternately and controllably to said first hot air duct and to said second hot air duct.

2. A foam slush molding apparatus as set forth in claim 1, wherein:
   a hot air inlet is provided through said opening in said hot air jacket; and
   a hot air outlet is provided at a part of said first hot air chamber opposite to said hot air inlet so that hot air uniformly flows in the hot air chamber from said inlet to said outlet.

3. The foam slush molding apparatus as set forth in claim 1, wherein said second hot air chamber is provided with a hot air inlet and a hot air outlet.

4. The foam slush molding apparatus as set forth in claim 1, wherein said switching means is a three-way valve.

5. The foam slush molding apparatus as set forth in claim 1, wherein said predetermined distance is uniform throughout said apparatus.

6. The foam slush molding apparatus as set forth in claim 1, wherein said predetermined distance is narrowed in at least one part of said apparatus.

7. The foam slush molding apparatus as set forth in claim 1, wherein said predetermined distance varies gradually throughout said apparatus.

8. The foam slush molding apparatus as set forth in claim 2, wherein a part of the mold which is adjacent said hot air inlet is recessed in a direction away from said inlet to allow said hot air to impinge upon said molding surface.

9. The foam slush molding apparatus as set forth in claim 1, wherein said hot air jacket is provided along and at a substantially uniform distance apart from said molding surface.

* * * * *